United States Patent
Simonson et al.

(10) Patent No.: US 10,254,399 B1
(45) Date of Patent: Apr. 9, 2019

(54) SMALL MOVER TARGET DETECTION IN SYNTHETIC APERTURE RADAR IMAGERY

(71) Applicant: National Technology & Engineering Solutions of Sandia, LLC, Albuquerque, NM (US)

(72) Inventors: Katherine M. Simonson, Cedar Crest, NM (US); David Nikolaus Perkins, Albuquerque, NM (US); Jeffrey A. Brooks, Albuquerque, NM (US); Roger Derek West, Albuquerque, NM (US); Ivan Lizarraga, Albuquerque, NM (US); Matthew Strosnick, Mountain View, CA (US); David A. Torgesen, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 658 days.

(21) Appl. No.: 14/957,394

(22) Filed: Dec. 2, 2015

(51) Int. Cl.
*G01S 13/90* (2006.01)

(52) U.S. Cl.
CPC .................. *G01S 13/9029* (2013.01)

(58) Field of Classification Search
CPC .................................... G01S 13/9029
USPC ............................. 342/25 R–25 F
See application file for complete search history.

(56) References Cited

U.S. PATENT DOCUMENTS

| 6,466,156 | B1 * | 10/2002 | Ulander | G01S 13/9029 342/159 |
| 6,608,585 | B2 * | 8/2003 | Benitz | G01S 13/9011 342/192 |
| 7,961,134 | B2 * | 6/2011 | Ranney | G06K 9/00711 342/174 |
| 7,965,226 | B2 | 6/2011 | Krikorian et al. | |
| 8,207,887 | B2 | 6/2012 | Goldman | |
| 8,692,704 | B1 * | 4/2014 | Perkins | G01S 13/90 342/191 |
| 8,786,485 | B2 * | 7/2014 | Atkins | G01S 13/89 342/189 |

(Continued)

OTHER PUBLICATIONS

R. Sabry, "A New Coherency Formalism for Change Detection and Phenomenology in SAR Imagery: A Field Approach," in IEEE Geoscience and Remote Sensing Letters, vol. 6, No. 3, pp. 458-462, Jul. 2009. (Year: 2009).*

(Continued)

*Primary Examiner* — Marcus E Windrich
(74) *Attorney, Agent, or Firm* — Medley, Behrens & Lewis, LLC

(57) ABSTRACT

The various technologies presented herein relate to detecting small moving entities or targets in radar imagery. Two SAR images can be captured for a common scene, wherein the scene is imaged twice from the same flight path. The first image is captured at a first instance and the second image is captured at a second instance, and differences between the two images are determined using a complex SAR change measure, excess coherency factor or DeltaC, based in part upon quantification of incoherent (or magnitude) change between the two images. A plurality of operations are performed to enable extraction of coherent change measures relating to the small moving entities from measures relating to large objects, stationary reflective structures, radar focusing artifacts, etc.

20 Claims, 14 Drawing Sheets

(56) References Cited

U.S. PATENT DOCUMENTS

2010/0007549 A1* 1/2010 Smith ................ G01S 13/9035
   342/25 A

OTHER PUBLICATIONS

Bouaraba, et. al., "Robust Techniques for Coherent Change Detection using Cosmo-Skymed SAR Images", Progress in Electromagnetics Research, vol. 22, pp. 219-232, 2012. (Year: 2012).*

Sabry, Ramin, "A New Coherency Formalism for Change Detection and Phenomenology in SAR Imagery: A Field Approach", IEEE Geoscience and Remote Sensing Letters, vol. 6, No. 3, Jul. 2009, pp. 458-462.

Fienup, J. R., "Detecting Moving Targets in SAR Imagery by Focusing", IEEE Transactions on Aerospace and Electronic Systems vol. 37, No. 3, Jul. 2001, pp. 794-809.

Goldstein, et al., "Detection of Dismounts using Synthetic Aperture Radar", IEEE Radar Conference, May 2010, pp. 209-214.

* cited by examiner

← - - - F

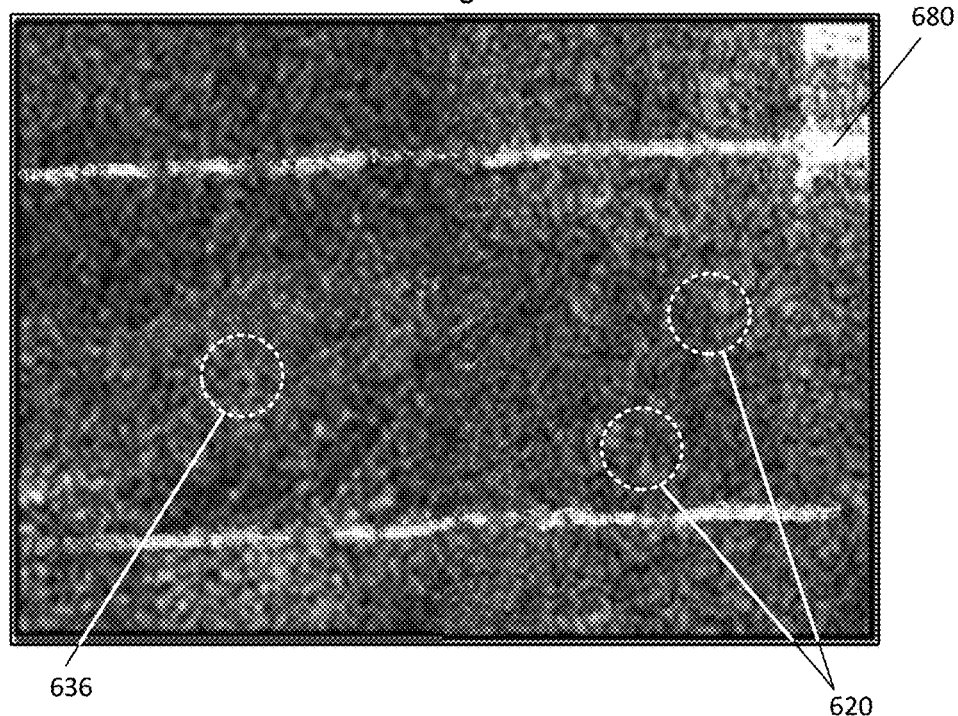
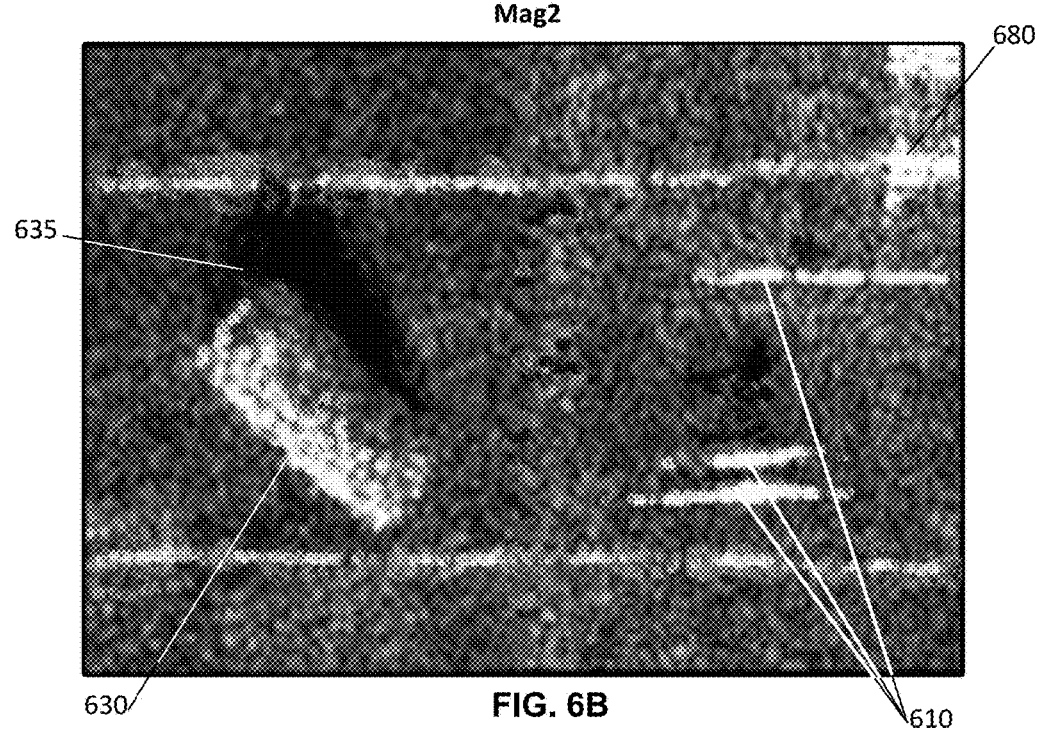

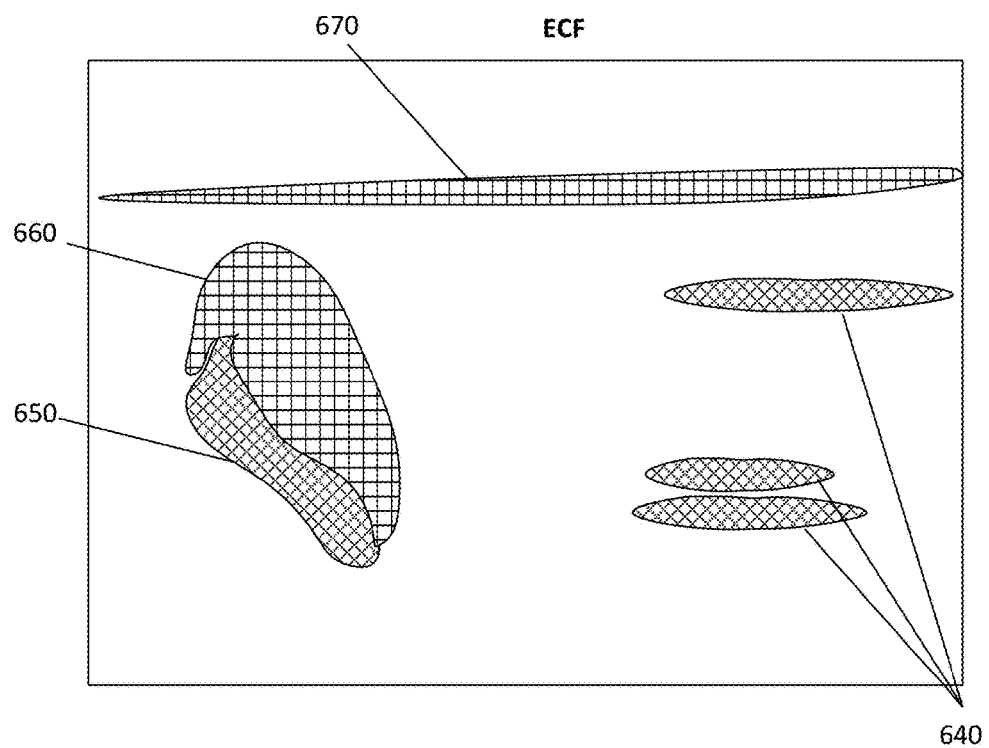

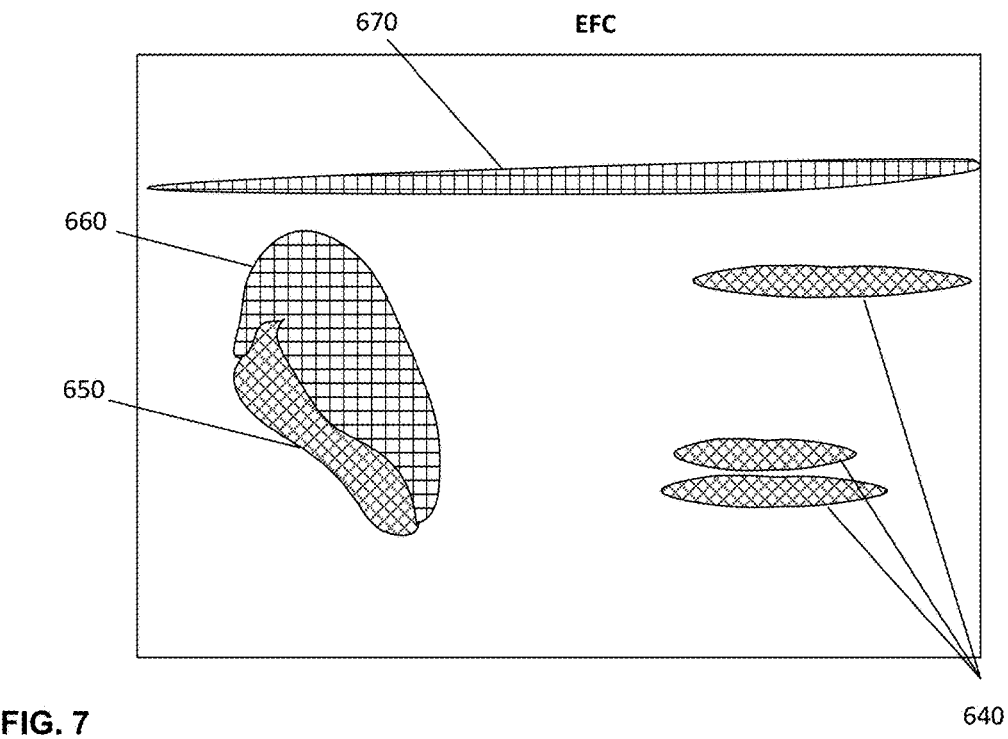
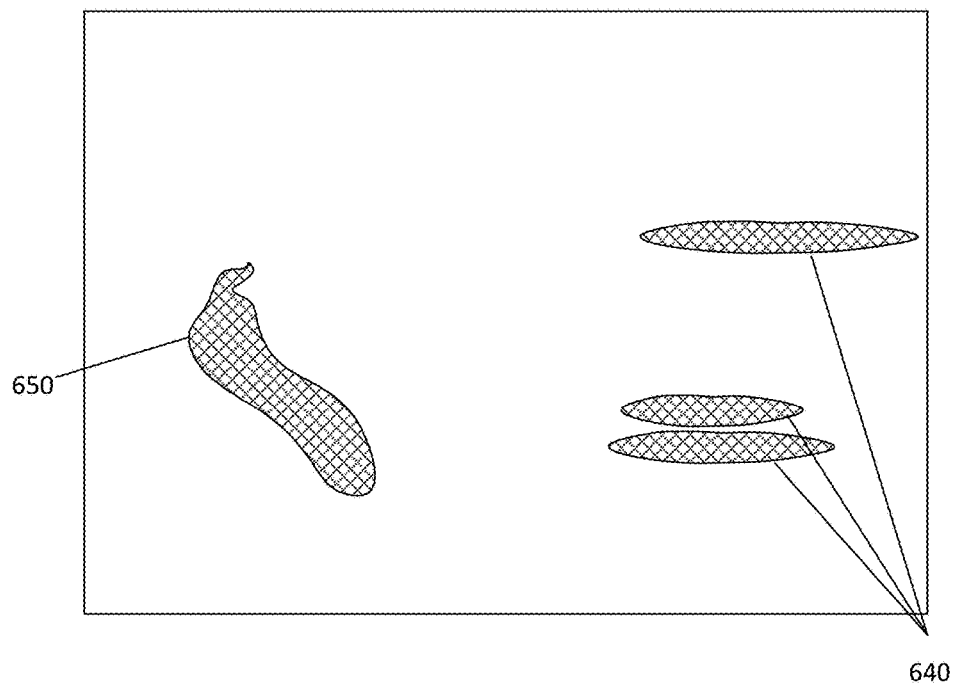
FIG. 7

FIG. 9A
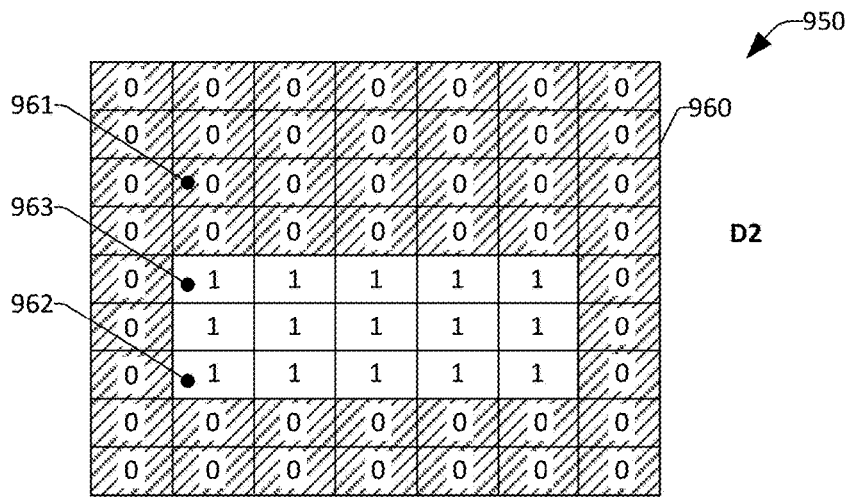
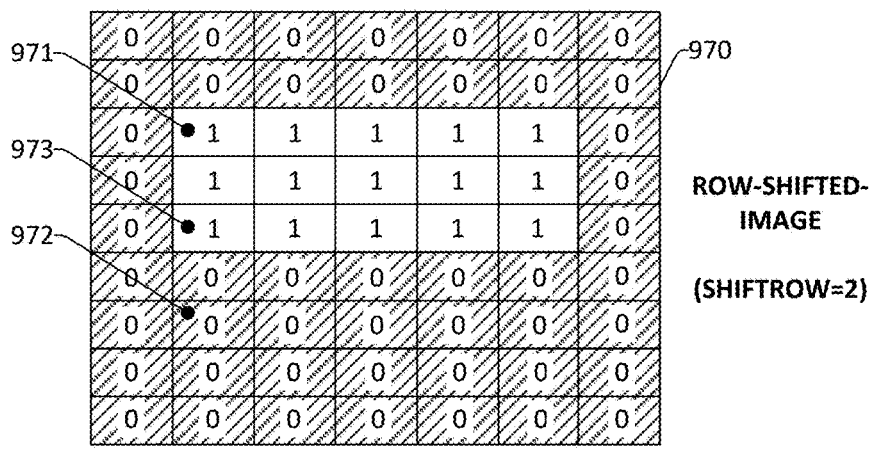
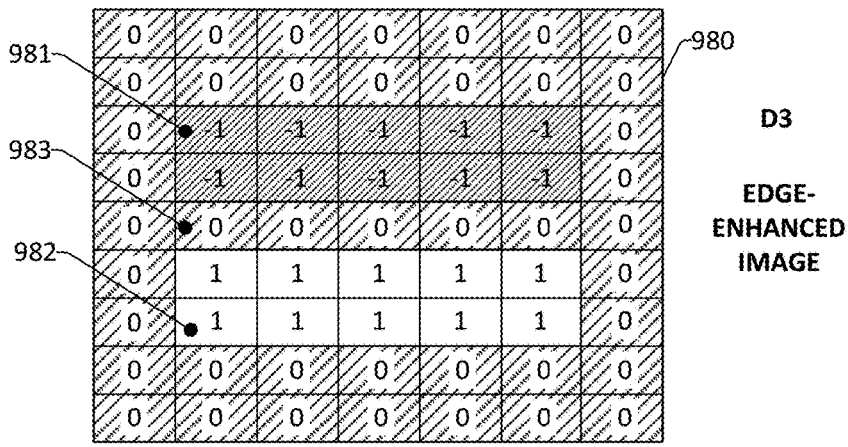

SMALL MOVER TARGET DETECTION IN SYNTHETIC APERTURE RADAR IMAGERY

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Detection of small moving targets, or entities, in a radar image (e.g., in a synthetic aperture radar (SAR) image) can be problematic owing to difficulties involved in distinguishing a legitimate mover(s) from other sources of radar energy. Such other sources can include azimuth sidelobes from bright reflective objects, radar focusing artifacts, or newly placed but stationary reflectors like parked vehicles that have arrived in a scene between passes of a radar system (e.g., an airborne radar system) during collection of radar images.

SUMMARY

The following is a brief summary of subject matter that is described in greater detail herein. This summary is not intended to be limiting as to the scope of the claims.

Various technologies presented herein relate to utilizing excess coherency processing to enable identification of at least one radar return presented in a SAR image as being generated by a small moving target (e.g., a person, an animal), and hence, the at least one radar return to be labeled as a small moving target. Automated detection of a small moving target in a SAR image can be quickly presented to an operator (e.g., a radar image analyst) which can further expedite apprehension of the person or animal which generated the small target radar return.

For a person who is moving as they are imaged by an airborne radar system, the person will have a radar return in a radar image that appears to be smeared in the cross-range dimension. However, other spurious signals are also present in a SAR image which can complicate target detection, such as a radar return from an inanimate, horizontally aligned (with respect to the aircraft flight path) reflector which can give rise to an elongated signal that looks similar to a target smear.

A first SAR image is generated from radar data captured during a first pass of a scene, and a second SAR image is generated from radar data captured during a second pass of the scene. In an embodiment, the SAR images can undergo smoothing to minimize deleterious effects of SAR speckle in subsequent image processing.

In an embodiment, an excess coherency factor (ECF) image (aka, a DeltaC image) can be generated based upon differences in received complex waveforms (e.g., amplitude and phase) between the first SAR image and the second SAR image, wherein the ECF is formed based upon registration of the first SAR image with the second SAR image. In an exemplary situation, radar returns from a small target are captured and present in the second SAR image, while no target radar returns are present in the first image. During formation of the ECF image, any signal magnitudes which are present in the first SAR image but are not present in the second SAR image are discarded (e.g., zeroed out). However, other radar returns may be present in the ECF image, e.g., the aforementioned horizontally aligned reflector (e.g., a road berm), a recently arrived vehicle, and other spurious radar returns. Hence, the small target radar return needs to be extracted from the other radar returns. Based upon application of one or more filters to the ECF image, pixels that do not satisfy certain constraints or procedures can be eliminated (e.g., set to zero energy) while the pixels (e.g., as a pixel cluster) that do meet certain filtering constraints can be retained and/or enhanced (e.g., by value strengthening). Subsequent to the filtering operation(s), the remaining pixels can be identified and their location applied to the original SAR images (e.g., the second SAR image) to identify a small moving target(s) in the original SAR image.

The sequence of filter operations can include:

a) removal of negative magnitude changes between the first SAR image and the second SAR image, e.g., by zeroing-out ECF (DeltaC) at pixel locations where magnitude of radar return has decreased between the first pass and the second pass of the airborne radar system.

b) removal of new energy (e.g., appears only in the second SAR image) that extends too far in the range dimension to represent a human (e.g., average human height) or an animal of interest. Such new energy can be generated by a newly arrived vehicle, wherein the vehicle has a longer range extent than is consistent for a human, for example.

c) row-differencing to enhance horizontal edges. An image shift process is utilized to increase or maintain values of pixels on the lower edge of a reflector while decreasing the values of pixels on the upper edge of the reflector. The row differencing causes a horizontal signal (e.g., a smear) to be enhanced to enable their detection to be improved over non-horizontally aligned signals.

d) smoothing in the cross-range direction. Any horizontal smears are extended in the horizontal (cross-range) direction to facilitate rejoining of pixels that may have become separated during prior processing, wherein the rejoined pixels may pertain to the target smear. Smoothing in the cross-range direction can result in range bins being added to a target smear.

e) bilateral gradient enhancement. A filter is applied to combine information from positive and negative gradients forming a pixel cluster, and to center signals in the range dimension. A combination of signals is greatest at a pixel where a positive gradient from one side of the pixel is combined with a negative gradient from the other side of the pixel.

f) thresholding of the gradients. A single threshold filter is applied, wherein those pixels having a value (e.g., an energy) greater than the threshold are determined to be pixels from new horizontal energy (e.g., from a moving target).

g) dimension-based pruning of pixel clusters. A plurality of constraints are applied to a pixel cluster, wherein if the cluster does not comprise a minimum number of cross-range bins (e.g., indicating insufficient motion of a target), comprises too many bins in the range direction (e.g., too many range bins to be a person), and/or having an incorrect aspect ratio, then the pixel cluster is discarded (e.g., zeroed out). Only pixel clusters satisfying the constraints is retained and identified as being a possible small moving target.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or

BRIEF DESCRIPTION OF THE DRAWINGS

FIG. 6A illustrates a Mag1 image according to an embodiment.

FIG. 6B illustrates a Mag2 image, according to an embodiment.

FIG. 6C illustrates a an ECF image, according to an embodiment

FIG. 7 illustrates a D1 product image formed from processing the ECF image, according to an embodiment.

FIG. 9A illustrates formation of a D3 product image from pixel values in a D2 product image.

DETAILED DESCRIPTION

Figure 1:
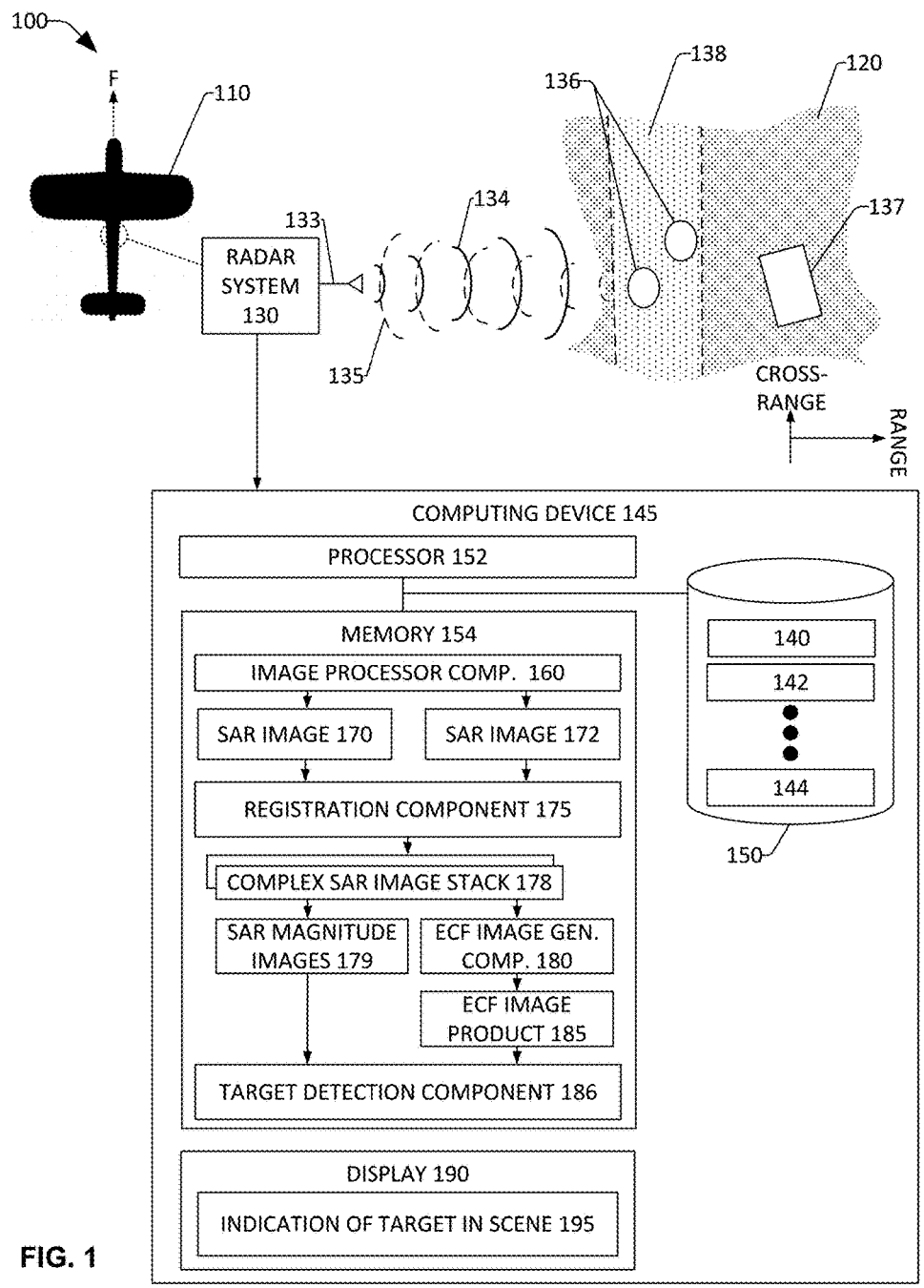
FIG. 1 illustrates a system for detecting a small object mover(s) in a scene, according to an embodiment.

Various technologies pertaining to detecting small moving entities or targets (also known as dismounts) in radar imagery, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As previously mentioned, it can be difficult to detect a small moving target(s), or entity, in a radar image owing to difficulties involved in distinguishing a legitimate mover(s) from other sources of radar energy. Such other sources can include azimuth sidelobes from bright reflective objects, radar focusing artifacts, newly placed but stationary reflectors like parked vehicles that have arrived in a scene between radar image collections, etc.

A radar image (e.g., a synthetic aperture radar (SAR) image) includes two main dimensions, known as range (in the vertical dimension) and cross-range (in the horizontal dimension). Airborne SAR systems can achieve high resolution in the cross-range dimension by transmitting and receiving energy as the aircraft transporting the radar system moves along its flight path. The motion of the aircraft is used to simulate the signals that would be generated from an antenna that is much longer than what could practically be carried on board. The distance travelled by the aircraft during the formation of a single image is referred to as the aperture, and the image is generated by mathematically focusing all of the signals received as the aperture is traversed. Because it takes time to fly the aperture, SAR images are not simple snapshots of the scene. In particular, anything that moves as the aperture is flown may be smeared (defocused) in the cross-range dimension. The various embodiments presented herein relate to distinguishing a horizontal smear(s) (streak(s)) characteristic of a small moving target(s) in SAR imagery from other sources of horizontal energy, e.g., a reflective object, a large object, etc.

FIG. 1 illustrates a system 100, whereby the system 100 can be a radar system configured to compare information in two or more radar images (e.g., two SAR images) to identify constituents of a scene (e.g., a terrain) captured in the two radar images, whereby the constituents can be small targets, large objects, manmade structures, naturally occurring features, etc.

FIG. 1 depicts an aircraft 110 (an airplane, an orbiting satellite, a drone, etc.) flying over a scene 120. The aircraft 110 has located thereon a radar system 130 that comprises an antenna 133. The antenna 133 is configured to transmit radar signals 134 (pulses, chirps, etc.,) and receive radar echoes 135, which have been generated by reflection of the radar signals 134 from the scene 120. The radar system 130 can include a controller (not shown), which is configured to control transmission of the signals 134, wherein the controller can be or be included in a digital signal processor, an application-specific integrated circuit (ASIC), or the like. Scene 120 can include a plurality of features and/or objects, including small moving targets 136, a larger object(s) 137 (e.g., a vehicle), a track 138, etc. As shown, the small targets 136 are exhibiting sufficient motion that their radar returns are smeared in the cross-range dimension.

For each pass of the aircraft 110 over the scene 120, the radar system 130 can generate a respective set of data. For example, the radar system 130 generates a first set of data 140 for a first pass over the scene 120, the radar system 130 generates a second set of data 142 for a second pass over the scene 120, the radar system 130 generates an $n^{th}$ set of data 144 for an $n^{th}$ pass over the scene, etc., where n is a positive integer. In an example, the passes over the scene 120 can be conducted with relatively similar geometry relative to the scene 120. The sets of data 140, 142, and 144 can be in any suitable format, such as Ground-Based SAR Application Testbed File Format (GFF).

The system 100 further comprises a computing device 145 that is in direct or indirect communication with the radar system 130. For example, the computing device 145 can be co-located with the radar system 130 on the aircraft 110. In another example, the computing device 145 can be located at a ground station and can be in network communication with the radar system 130. In yet another example, the computing device 145 can be in indirect communication with the radar system 130. In such a case, the radar system 130 can have computer-readable storage co-located therewith for retaining the sets of data 140-144, and such data can be transferred to the computing device 145 through any suitable communications medium (e.g., wired or wirelined). Moreover, the computing device 145 can be distributed in nature, wherein some functionality described as being performed by the computing device 145 may occur on the aircraft 110, while other functionality may occur at a base station or processing facility.

The computing device 145 comprises a data store 150 which can retain the sets of data 140, 142, 144. The computing device 145 additionally includes a processor 152 and memory 154, where the memory 154 comprises components that are executed by the processor 152. While the memory 154 is shown as including several components, it is to be understood that FIG. 1 illustrates an exemplary embodiment. In other embodiments, rather than being implemented in memory, the components can be integrated circuits that are configured to perform specified functionality.

In the exemplary system 100 shown in FIG. 1, an image processor component 160 is included in the memory 154, wherein the image processor component 160 is configured to generate SAR images based upon data generated by the radar system 130, wherein the SAR images can be complex-valued SAR images. With more particularity, the image processor component 160 is configured to generate a first SAR image 170 based upon the first set of data 140 and a second SAR image 172 based upon the second set of data 142. Accordingly, the first SAR image 170 depicts the scene 120 for the first pass over the scene 120, and the second SAR image 172 depicts the scene 120 for the second pass over the scene 120. The image processor component 160 is configured to generate the first SAR image 170 and the second SAR image 172 such that each image comprises phase data and magnitude data.

Figure 2:
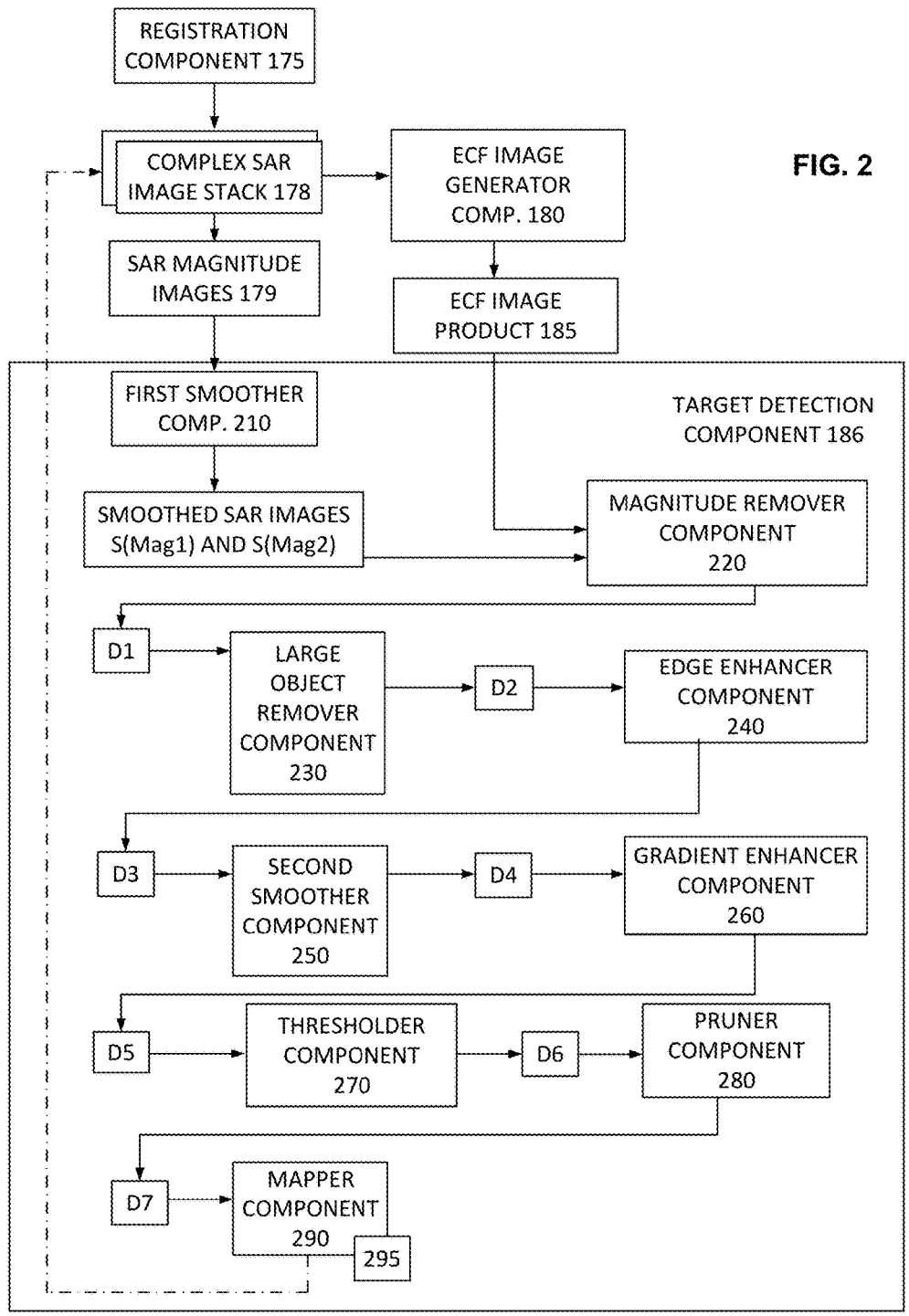
FIG. 2 presents a schematic of a target detection component to be utilized in processing radar images/products, according to an embodiment.

Hereafter, FIG. 1 can be read in conjunction with FIG. 2, wherein FIG. 2 and pertinent text expands upon concepts presented in FIG. 1. A registration component 175 is utilized to co-register the first SAR image 170 and the second SAR image 172 to form a complex SAR image stack 178. The complex SAR image stack 178 can be utilized to generate SAR magnitude images 179. The SAR magnitude images 179 can comprise (real-valued) SAR magnitude images, as opposed to the (complex-valued) SAR images in the complex SAR image stack 178, wherein the SAR magnitude images 179 can undergo smoothing (as further described below). However, the (complex-valued) SAR images in the complex SAR image stack 178 can be utilized to generate an excess coherency factor (ECF) image (e.g., ECF image 185, as further described below).

An ECF image generator component 180 is included in the memory 154, wherein the ECF image generator component 180 is configured to generate an ECF image 185 (also known as a DeltaC, $\Delta_c$, image) from the first SAR image 170 and the second SAR image 172 (e.g., from the complex SAR image stack 178). The ECF image 185 depicts pixels that have undergone a change in magnitude and phase between the first SAR image 170 and the second SAR image 172 (e.g., a measure of change between the times of capture of the two SAR images 170 and 172). Generation of an ECF image is disclosed by Ramin SABRY, "A New Coherency Formalism for Change Detection and Phenomenology in SAR Imagery: A Field Approach", July 2009, which is incorporated herein by reference. The ECF image 185 can be formed from the SAR images 170 and 172. Hence, as shown in FIGS. 1 and 2, from a pair of complex-valued SAR images in the complex SAR image stack 178, two real-valued SAR magnitude images 179 can be computed, and further, a real-valued ECF image 185 can also be computed.

Figure 3:
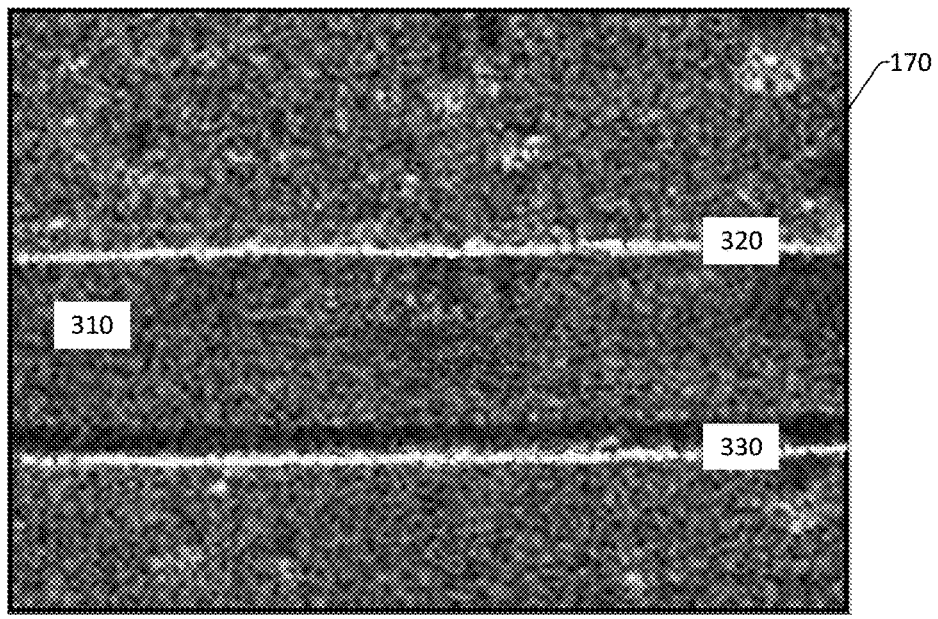
FIG. 3 illustrates a SAR image product comprising radar reflections from inanimate objects in a scene, according to an embodiment.
Figure 4:
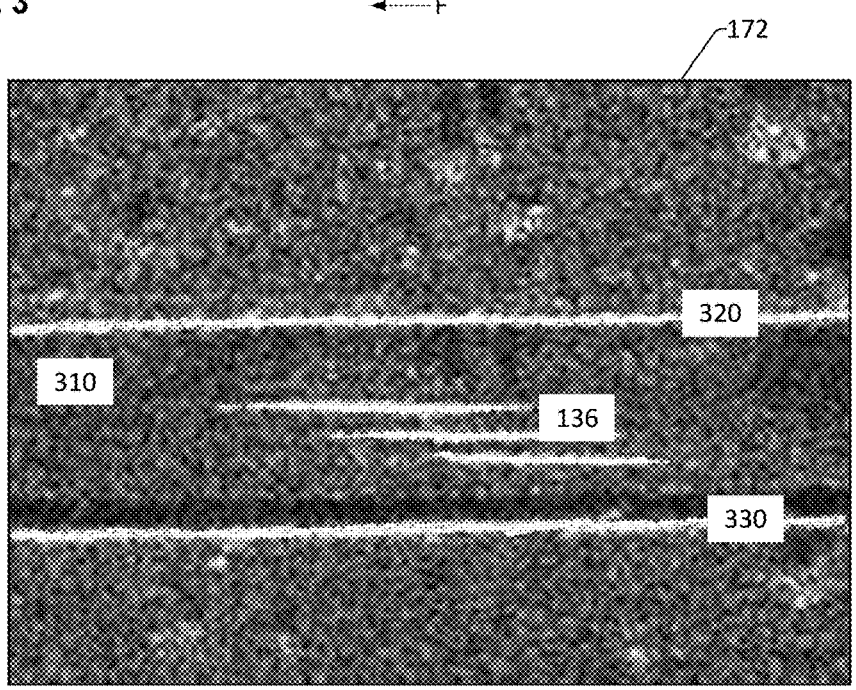
FIG. 4 illustrates a SAR image product comprising radar reflections from inanimate objects and at least one small moving target in a scene, according to an embodiment.
Figure 5:
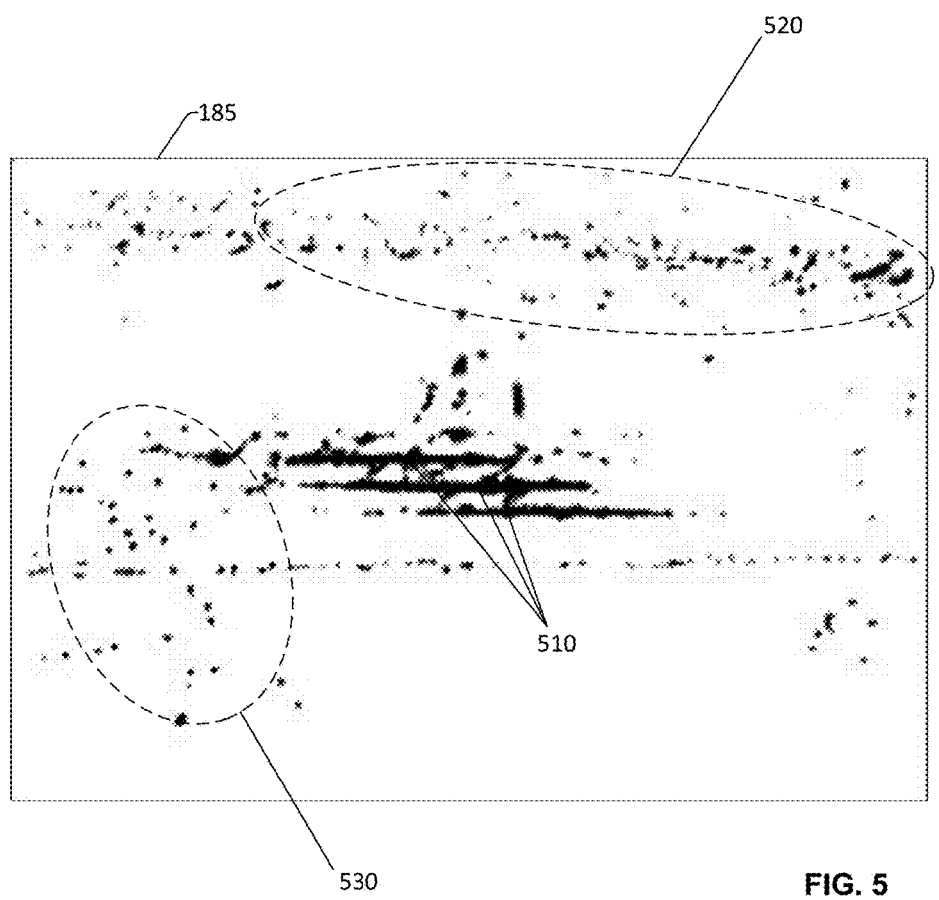
FIG. 5 illustrates an excess coherency factor (ECF) image product, according to an embodiment.

To facilitate understanding of the various concepts presented herein, an example situation of a plurality of small targets moving along a track is illustrated. As shown in FIG. 3, the first SAR image 170 comprises a track 310 which is bordered by a pair of berms 320 (upper berm) and 330 (lower berm). FIG. 4, the second SAR image 172 is a capture of the scene 120 at a subsequent time wherein three small targets 136 are moving on the track 310. Owing to the motion of the aircraft based radar 130 and antenna 133 being in direction F, the motion of the small targets 136 causes a respective horizontal smear to be generated in the cross-range direction (as previously mentioned). However, owing to the berms 320 and 330 being horizontally aligned in the same direction as the flight path F of the aircraft 110, reflected energy from the berms 320 and 330 causes the berms 320 and 330 to be presented as possible smears, which can confuse a target detection system. Accordingly, for a target detection system to operate with a high degree of success and accuracy in identifying targets, it is beneficial that the target detection system is able to differentiate the smears resulting from the small targets 136 from unwanted artifacts such as the reflections from the berms 320 and 330. FIG. 5 presents an ECF image 185 generated from the first SAR image 170 and the second SAR image 172, wherein ECF smears 510 resulting from the targets 136 causing a change in energy magnitude between the first SAR image 170 and the second SAR image 172 are visible. However, as shown in FIG. 5, spurious energies 520 and 530 are also present due to reflections from the berms 320 and 330, shadows, etc., wherein the spurious energies can complicate target detection. It is to be appreciated that to facilitate depiction of the various features presented in FIGS. 3-5, the contrast of FIG. 5 has been inverted. In FIGS. 3 and 4 a white, bright region indicates a high magnitude value, and a dark region indicates a low magnitude value. In FIG. 5, a white, bright region indicates a low magnitude change, and a dark region indicates a high magnitude change. It is to be noted that the changes depicted in the ECF image 185 resulting from the berms 320 and 330 are less than (e.g., weaker, much weaker) the changes resulting from the Doppler-shifted energy of the moving targets 136, hence the ECF cancels out horizontal energy that has not changed in magnitude and phase (as previously mentioned, the horizontal smears resulting from the moving targets 136 are caused by the changes in the Doppler frequency of received waveforms reflected from the moving targets 136).

The embodiments presented herein relate to a positive change in magnitude being detected owing to the targets 136 being present in the scene 120 during the second flyby of the aircraft 110. However, it is to be appreciated that a negative change in magnitude can also occur between a first captured SAR image and a subsequently captured SAR image, where moving targets were present in the scene during the first flyby but had vacated the scene (e.g., walked away) at the time of the second flyby of the aircraft 110.

A target detection (TD) component 186 is further included in the memory 154, wherein the TD component 186 is configured to identify one or more targets (e.g., small targets 136) in a scene (e.g., scene 120). As shown in FIG. 2, the TD component 186 can include a plurality of components and algorithms which can be utilized to identify a small target(s) in a plurality of SAR images. The following introduces and describes the various components included in the TD component 186 as the various components interact with the SAR magnitude images 179, the ECF image 185, and various image products generated during detection of one or more small moving targets.

During execution of the various components included in the TD component 186, a plurality of parameters (e.g., tunable parameters) can be utilized, as further described, wherein the parameters are detailed in Table 1, including example settings which were applied during generation of the one or more images presented herein. Settings for the respective parameters can vary with radar properties (e.g., resolution, polarization, oversampling factor, etc.) and imaging geometry (e.g., depression angle, squint angle, etc.), as well as different radar systems and ground conditions (e.g., of scene 120).

TABLE 1

Tunable parameters for target detection

| PARAMETER NAME | DESCRIPTION | LIMITATIONS | EXAMPLE SETTING |
|---|---|---|---|
| MEANBOX.ROW MEANBOX.COL | Dimensions of box for smoothing magnitude differences in large object removal | Odd-valued integers | ROW 1 COL 5 |
| THRESH1 | Threshold level used for large object removal | Positive float | 0.30 |
| RANGE1 | Number of consecutive range bins above THRESH1 for large object removal | Positive integer | 15 |
| SHIFTROW | Number of rows image is shifted in edge enhancement | Positive integer | 2 |

TABLE 1-continued

Tunable parameters for target detection

| PARAMETER NAME | DESCRIPTION | LIMITATIONS | EXAMPLE SETTING |
|---|---|---|---|
| FILTCOL | Box size for smoothing row-shifted product | Odd-valued integer | 15 |
| FILTROW | Box size for max filter | Odd-valued integer | 11 |
| THRESH2 | Threshold for detection clusters | Positive float | 0.45 |
| LEN2 | Minimum number of cross-range bins for detection clusters | Positive integer | 15 |
| RANGE2 | Maximum number of range bins for detection clusters | Positive integer | 15 |
| RAT2 | Minimum aspect ratio for detection clusters | Positive float | 2.0 |
| THRESH3 | Threshold for computing final column length | Positive float | 0.30 |

Initially, the SAR magnitude images 179 generated from the complex SAR image stack 178 and the ECF image 185 are received at the TD component 186. In the following, the magnitude of the first SAR image 170 that has undergone registration is also referred to as Mag1 (e.g., SAR magnitude image 1) and the magnitude of the second SAR image 172 that has also undergone registration is also referred to as Mag2 (e.g., SAR magnitude image 2).

A first smoother component 210 is included in the TD component 186, wherein the first smoother component 210 is configured to smooth the SAR magnitude images 179, to generate respective smoothed image products S(Mag1) and S(Mag2). The first smoother component 210 (e.g., a smoothing kernel) can be a running mean box filter with respective row and column dimensions equal to MEANBOX.ROW and MEANBOX.COL, and is applied to minimize impact of SAR speckle (e.g., noise) on the raw magnitudes in the Mag1 and the Mag2 images.

FIGS. 6A-6C presents three image chips, S(Mag1) (e.g., derived from the first SAR image 170), S(Mag2) (e.g., derived from the second SAR image 172), and ECF (e.g., the ECF image 185). It is to be appreciated that owing to the limitations of reproduction a number of schematics are utilized to represent various energy magnitudes/values for pixels comprising various images and products presented herein. As will be understood by a person having skill in the art, the various pixel clusters described herein will have a plurality of values across the cluster as opposed to the common value inferred by the respective shading utilized to depict a cluster. As shown, by comparing S(Mag1) and S(Mag2), it appears that three small moving targets (e.g., per potential target smears 610) have entered the scene during capture of the S(Mag2) image as the radar energies associated with the moving target smears 610 are not present in regions 620 of S(Mag1). Further, an area of energy 630 and shadow 635 are also present in the S(Mag2) image, while not present in the S(Mag1) image, wherein the areas 630 and 635 could indicate a large object being present, e.g., a vehicle has entered the scene at the previously vacant area 636. It is to be noted that the ECF product highlights both positive changes (e.g., pixels 640 which result from the moving target smears 610 and pixels 650 from the reflection from the large object associated with the smear 630) and also negative changes (e.g., pixels 660, SAR shadows 635 from the large object associated with the smear 630). The ECF product further includes a horizontal smear 670 of pixels potentially due to radar sidelobes from a bright reflector 680 which is visible in both the S(Mag1) image and the S(Mag2) image.

A magnitude remover component 220 is included in the target detection component 186 and is configured to receive the three image products: the smoothed image products S(Mag1) and S(Mag2), and the ECF image 185. Owing to the smoothed image products S(Mag1) and S(Mag2), and the ECF image 185 all being generated from the same co-registered images in the SAR image stack 178, each image product has the same dimension.

The magnitude remover component 220 is further configured to detect any horizontal return energy(ies) that are present during the second imaging pass (e.g., in S(Mag2)) but not the first pass (e.g., in S(Mag1)), wherein, such return energy(ies) are present as a pixel having a first brightness in the S(Mag2) which is greater than a second brightness for the same pixel in S(Mag1). Since the ECF image 185 will also show horizontal energy that is present in the first pass but not the second pass, any ECF energy (e.g., DeltaC) at pixel locations in the ECF image 185 where the energy magnitude has dropped between the first pass and the second pass can be zeroed-out (e.g., where the first brightness for a pixel in S(Mag2) is less than the second brightness for the pixel in S(Mag1)).

The magnitude remover component 220 is configured to set to zero all pixels having a EFC where S(Mag1)≥S(Mag2). The resulting derived product is denoted a D1 product (a magnitude removed ECF image). D1 is derived for each pixel location [i,j], per Eqn. 1:

$$D1[i, j] = \begin{cases} EFC[i, j], & \text{if } S(Mag1[i, j]) < S(Mag2[i, j]), \\ 0, & \text{otherwise.} \end{cases} \quad (1)$$

Accordingly, per Eqn. 1, a value of ECF is assigned to each pixel [i, j] if the magnitude for the pixel in the S(Mag2) product is greater than the magnitude for the corresponding pixel in the S(Mag1) product, otherwise a pixel [i, j] having a magnitude of the S(Mag1) product>than the S(Mag2) product is set to zero (zeroed out).

The effects of removing negative magnitude change from the ECF image to generate the D1 product is shown in FIG. 7. As shown in the D1 product chip in comparison with the ECF chip, the SAR shadow 660 from the large object smear 630 have been removed from the ECF chip, along with the horizontal smear 670 from a bright reflector of Mag1. Any other SAR shadows from other objects, e.g., the small target smears 610 can also be removed.

A large object remover component 230 is further included in the target detection component 186, wherein the large object remover component 230 is configured to remove large objects by removing any new energy (e.g., in the second SAR image 172) that extends too far in the range (vertical) dimension to plausibly represent a small moving object such as a person, an animal, etc. Such patterns can be due to a new large object(s) (e.g., a vehicle(s)) (per smear 630) that has arrived in the scene 120 between radar collection passes. The removal of new radar energy from the D1 product is accomplished by thresholding the D1 product with a first threshold value (e.g., a low value), wherein the value is denoted THRESH1, per Table 1. The threshold value is a measure in the range direction of the D1 product that a person is considered to be less than, while a large object may exceed the threshold value in the D1 product. During thresholding, an operator is applied to each column of pixels (e.g., in the range direction) of the D1 product, zeroing out all sequences of consecutive pixels that cover more than (extend beyond) a distance comprising RANGE1 rows. The large object remover component 230 is configured to detect stacks of consecutive pixels in the D1 product, whose value exceeds the threshold THRESH1. If the height of such a stack (within one column of pixels) exceeds RANGE1, then the pixels in the stack are zeroed out. An appropriate value for RANGE1 can be computed based on radar parameters and imaging geometry, as previously mentioned. The resulting thresholded product is denoted a D2 product (an object removed ECF image).

Figure 8:
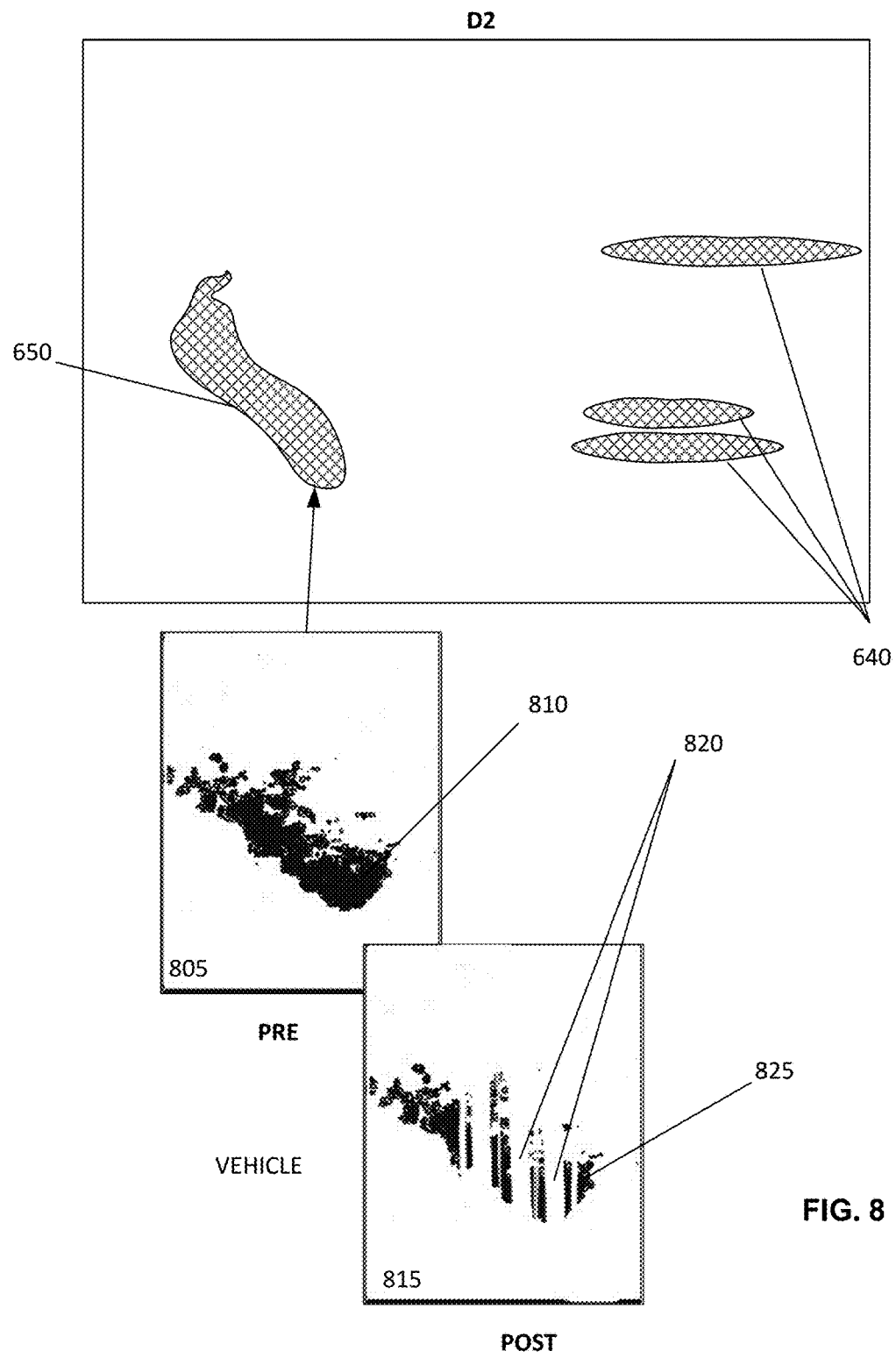
FIG. 8 illustrates a D2 product image formed from processing the ECF image, according to an embodiment.

The effects of large object removal on the example chip is shown in FIG. 8. Because pixel clusters 640 from the target smears 610 do not extend over a configured threshold number of range bins (e.g., the number of range bins is set to an approximate height of a human being, RANGE1), comparing the D1 product (per FIG. 7) and the D2 product, the D1 product and the D2 product are identical.

However, to provide understanding, FIG. 8 also includes a pre-threshold chip 805 (comparable to D1 product) and post-threshold chip 815 (comparable to D2 product) for a scene where a large vehicle arrived between the first radar pass and the second radar pass. A number of portions of the vehicle have a height that is greater than the configured number of range bins (e.g., regions 810), and thus a number of pixel sequences at those over-height regions are zeroed out, which is apparent as columns of pixels 810 with energies exceeding the RANGE1 shown in the pre-threshold chip 805 are not present in the post-threshold chip 815, zeroed out regions 820. Hence, only the pixel columns 825 which do not exceed the configured number of range bins remain. The zeroing out of the over-height pixels 820 leads to a post-threshold chip 815 comprising less pixels having a given energy magnitude than were present in the pre-threshold chip 805 (e.g., only pixels 825 remain from pixels 810).

An edge enhancer component 240 is further included in the target detection component 186, wherein the edge enhancer component 240 is configured to utilize row differencing of pixels to enhance a horizontally-aligned structure(s) in the D2 product, e.g., to enhance horizontal edges. The transformation is defined, per Eqn. 2, for a pixel at row i and column j, to determine a D3 product (a row differenced ECF image) for each pixel:

$$D3[i,j]=D2[i,j]-D2[i-\text{SHIFTROW},j]. \quad (2)$$

The edge enhancer component 240 is configured to apply a row differencing filter to increase a value of pixels on the lower edge of a bright reflector, while decreasing a value of pixels just above the upper edge of the bright reflector. If the bright reflector is horizontal, these patterns will persist across adjacent columns of pixels. The row differencing filter can utilize the D2 product image along with a copy of the D2 product image, wherein the D2 product image copy can be considered to be overlaid on to the D2 product image, wherein the D2 product image copy is offset by a number of pixel widths defined in the SHIFTROW value. Subtracting, pixel-by-pixel, a value of a pixel in the D2 product image copy (e.g., a row-shifted image) from a corresponding pixel in the D2 product image generates an edge-enhanced image, D3.

Figure 9:
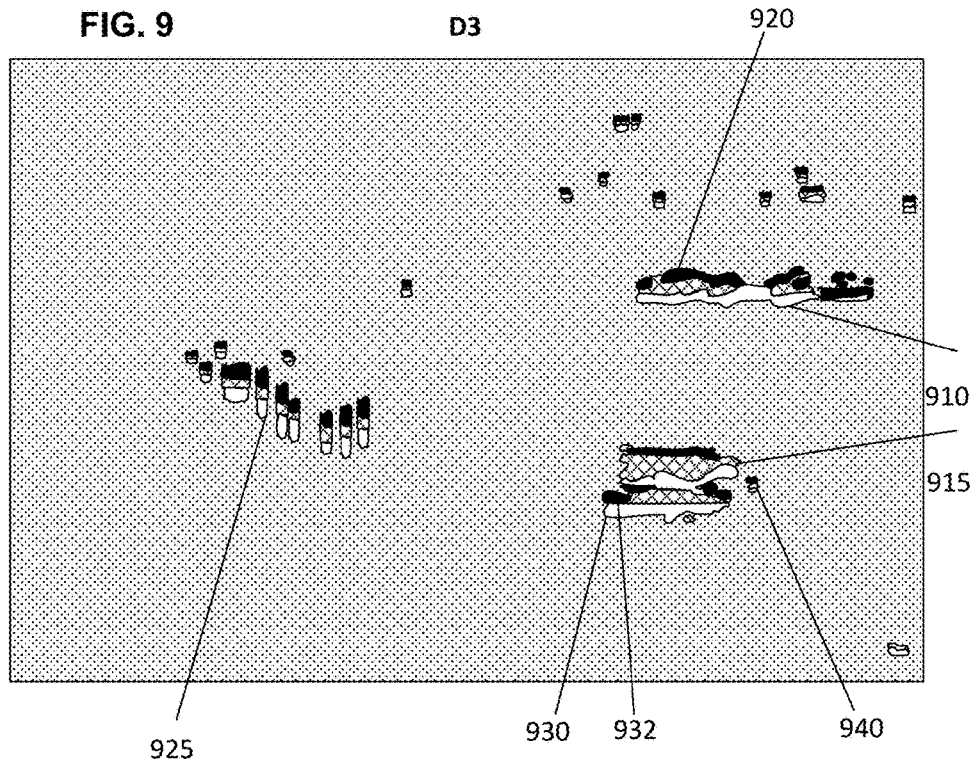
FIG. 9 illustrates a D3 product image formed from processing the D2 product image, according to an embodiment.

FIG. 9 illustrates the effects of an edge-enhancing operation, with bright (pixel clusters 910 and 930), mid-tone (pixel clusters 915), and dark regions (pixel clusters 920 and 932) being depicted. FIG. 9A depicts a simplified edge enhancing operation 950 being performed, with a D2 product image 960, a row-shifted image 970, and a D3 edge-enhanced image 980 being illustrated. A D2 product image is received, whereupon respective pixel values in the D2 product image are shifted in accordance with the SHIFT-ROW value to form a row-shifted image. The edge-enhancing operation is performed across the entirety of pixels forming the D2 product image, wherein an effect of the edge-enhancing operation will be most pronounced at a pixel cluster having a magnitude different to that of a background (zeroed-out) of the D2 product image. In the illustrated example, SHIFTROW=2, and as shown, respective pixel values in the D2 product image that have a value of 0 (e.g., pixel 961), have a value of 1 (e.g., pixel 971) in the row-shifted image. Further, for some of the pixels in the D2 product image having a value of 1 (e.g., pixel 962), the corresponding pixels in the row-shifted image (e.g., pixel 972) have a value of 0, owing to the row shifting operation.

The edge-enhanced image D3 is generated by subtracting a value of a pixel in the row-shifted image 970 from a value of a pixel in the D2 product image, on a pixel-by-pixel basis. The edge-enhancing operation results in:

(a) pixels that are bright (value=1) in both the D2 product image 960 and the row-shifted image 970 are cancelled out to have a value=0 in the D3 image 980. For example, D2[i, j] (pixel 963)−D2[i−SHIFTED, j] (pixel 973)=D3[i, j] (pixel 983), 1−1=0.

(b) pixels that are bright (value=1) in the D2 product image 960 but are not bright (value=0) in the row-shifted image 970 result in the corresponding pixel in the D3 image 980 remaining bright. For example, pixel D2[i, j] (pixel 962)−D2[i−SHIFTED, j] (pixel 972)=D3 [i, j] (pixel 982), hence 1−0=1.

(c) pixels that are not bright (value=0) in the D2 product image 960 but are bright (value=1) in the row-shifted image 970 result in the corresponding pixel in the D3 image 980 being darker. For example, pixel D2[i, j] (pixel 961) value−D2[i−SHIFTED, j] (pixel 971)=D3[i, j] (pixel 981), hence 0−1=−1.

It is to be appreciated that while the pixel values depicted in the edge-enhancing operation 950 are binary, 1 or 0, the pixel values for real data comprise floating point numbers between 0 and 1, and thus the pixels in the edge-enhanced image D3 can have a value between −1 and 1, rather than the simple values of −1, 0, 1, presented in FIG. 9.

Accordingly, for those pixels in the D2 product image that have a high magnitude and are overlaid with pixels having a high magnitude in the D2 product image copy, the value of the corresponding pixel in the D3 product will be at or about zero owing to the values of the respective pixels cancelling each other out (e.g., the D3 pixel will be mid-tone). For those pixels in the D2 product image having a high magnitude which are overlaid with a pixel in the D2 product image copy having a low magnitude, the corresponding pixel in the D3 product will remain bright owing to the effect of subtracting a low magnitude pixel from a high magnitude pixel. Further, for those pixels in the D2 product image having a low magnitude which are overlaid with a pixel in the D2 product image copy having a high magnitude, the corresponding pixel in the D3 product will have an even lower magnitude (e.g., the D3 pixel with be a dark tone) owing to the effect of subtracting a high magnitude pixel from a low magnitude pixel The result of row differencing on the example chip is shown in FIG. 9, with the D2 product generating a D3 product. FIG. 9 is a schematic comprising light pixel regions 910, intermediate pixel regions 915 (with the checked patterning), and dark pixel regions 920. The light pixel regions 910 (and pixels 930) result from the row differencing filter maintaining the value of pixels on the lower edge of a bright reflector, the dark pixel regions 920 (and pixels 932) result from the row differencing filter decreasing the value of pixels on the upper edge of a bright reflector, and the mid-tone pixels 915 result from respective bright pixels cancelling each other out. Owing to the limits of reproduction while the light pixel regions 910 and the dark pixel regions 920 are represented as a binary system of light pixels and dark pixels, the respective energies of the plurality of pixels forming the D2 product (from which the light and dark regions 910 and 920 are generated) are not simply a high energy value or a low energy value, but rather can comprise of a range of energies (or brightness) (e.g., between −1 and 1, as previously mentioned) and hence each pixel in the D3 product (e.g., D3[i, j]) will have a value based upon the value of the pixel D2[i, j] and the value of the pixel located at D2[i−SHIFTED, j]. Pixel clusters 925 display the same bright pixel, intermediate pixel, and dark pixel regions for edge-enhancement of the pixel columns 825 from the large object 650.

Figure 10:
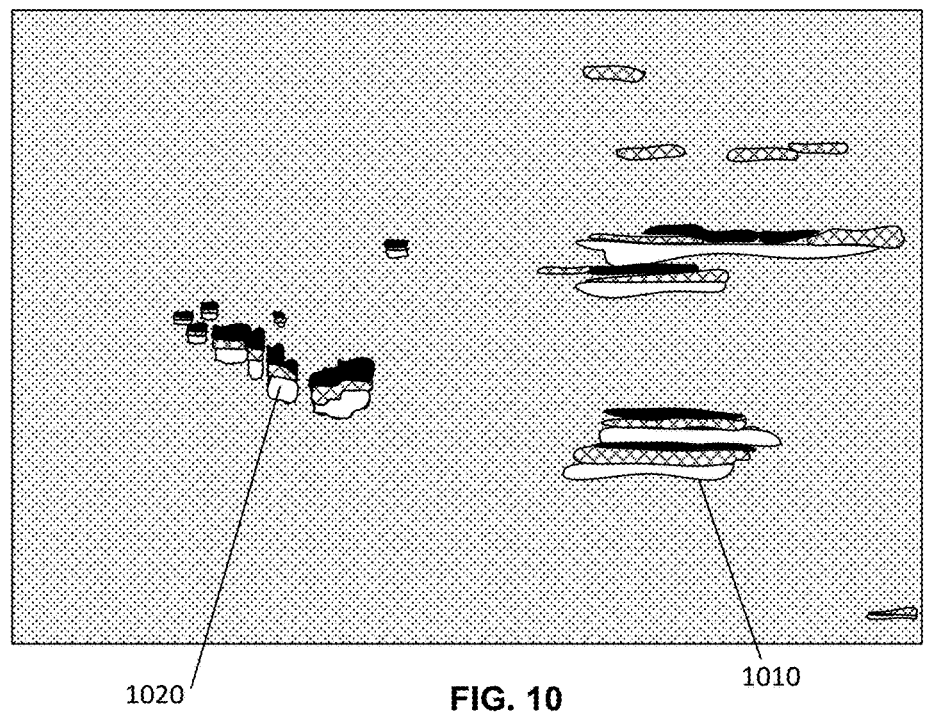
FIG. 10 illustrates a D4 product image formed from processing the D3 product image, according to an embodiment.

A second smoother component 250 is also included in the target detection component 186, wherein the second smoother component 250 is configured to apply a smoothing filter to smooth the rows of the D3 product in the cross-range dimension using a running mean box covering a number of pixel columns, as defined by the FILTCOL setting of Table 1. The smoothing filter enables joining of edge signals for pixel groupings that may have been split into discrete segments of pixels due to pixel noise. The resulting smoothed product is denoted a D4 product (an edge-enhanced cross-range smoothed, ECF image). The results of cross-range smoothing are seen in FIG. 10 wherein the pixel segments in the D3 product (e.g., pixel segments 930 and 940) are cross-range smoothed to form a group of joined pixels 1010. The pixels 1010 display a strong horizontal structure for the small target signatures 610. The pixels 1020 display a weaker horizontal structure for the remnants of the large target signatures 925.

A gradient enhancer component 260 is further included in the target detection component 186, wherein the gradient enhancer component 260 is configured to perform bilateral gradient enhancement. Gradient enhancement combines information from positive and negative gradients, and centers signals in the range dimension. As part of the gradient enhancement process, the gradient enhancer component 260 is configured to execute a bilateral filter that differences the largest gradient values above and below each pixel in the D4 product. The bilateral filter operates within each column of pixels (e.g., in the range direction), over a window configured to cover a plurality of rows as defined by a FILTROW value, where FILTROW is an odd-valued integer specified as one of the tunable parameters in Table 1. The gradient enhancer component 260 is configured to generate a definition for an integer BAND=trunc(FILTROW/2). For each pixel [i,j], the gradient enhancer component 260 executes the bilateral filter to compute a D5 product (a gradient enhanced ECF image), per Eqn. 3:

$$M1[i,j]=\max(D4[i-1,j],D4[i-2,j],\ldots,D4[i-BAND,j])$$

$$M2[i,j]=\min(D4[i+1,j],D4[i+2,j],\ldots,D4[i+BAND,j])$$

$$D5[i,j]=M1[i,j]-M2[i,j] \qquad (3)$$

The bilateral filtering defined in Eqn. 3 operates as follows. For strong horizontal smears in the ECF image, the bilateral filter executed by the edge enhancer component 240 (e.g., Eqn. 2) can generate positive values for pixels located along the bottom of a smear (e.g., pixels 930 of FIG. 9), and negative values for pixels located along the top of the smear (e.g., pixels 932 of FIG. 9). The quantity product D5, as defined in Eqn. 3 will be largest when a positive value of M1 is combined with a negative value of M2.

Figure 11:
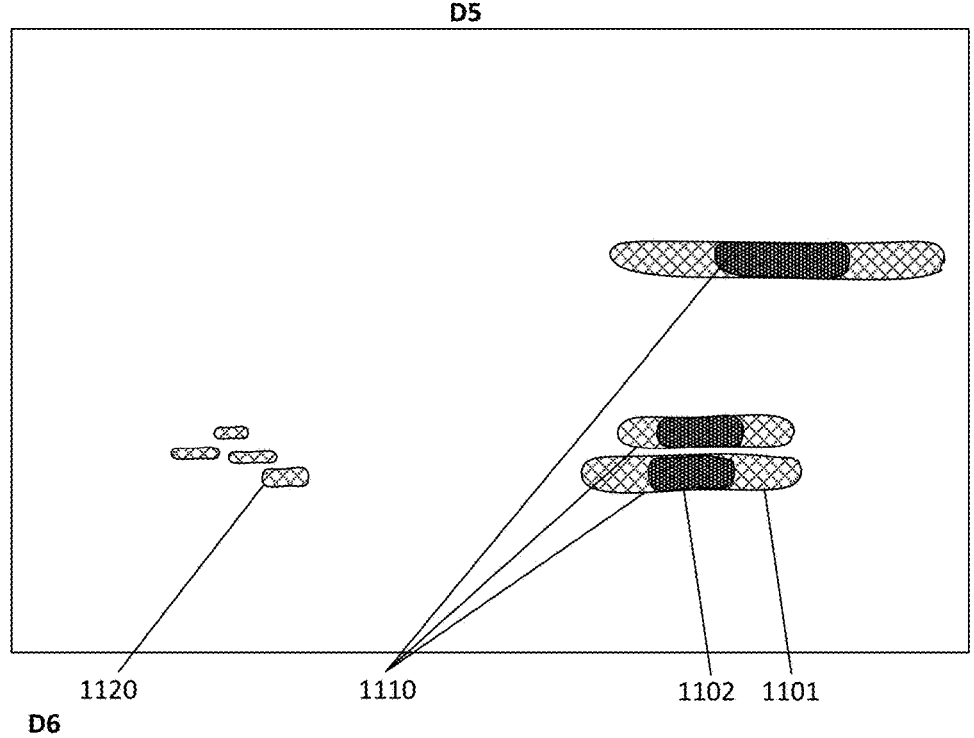
FIG. 11 illustrates a D5 product image formed from processing the D4 product image, according to an embodiment.

Results of applying the bilateral filter to the example chip is presented in the schematic shown in FIG. 11. The checkered patterning 1101 indicates regions of pixels having a weaker signal than the darker patterning 1102 indicating regions of stronger signal strength. It is to be noted that the pixel clusters 1110 shown for the three small target smears 610 include strong signal type pixels 1102 and weaker signal type pixels 1101, while the pixel clusters 1120 for the large vehicle smear 650 only include weaker signal type pixels 1101. FIG. 11 is an inverted image, hence the brightness of the pixels 1110 associated with the three small target smears 610 are darker at the central regions of the smears than the pixels 1120 resulting from spurious signals/large objects. Further, the smears 1110 also cover a wider swath in the cross-range dimension, as expected of the Doppler-shifted energy due to motion as the airborne aperture is flown across the scene 120.

A thresholder component 270 is further included in the target detection component 186, wherein the thresholder component 270 is configured to execute a gradient threshold filter to threshold the gradients which were enhanced by the gradient enhancer component 260 in the D5 product. During gradient thresholding, the thresholder component 270 applies a second threshold filter having a single threshold value, denoted THRESH2 in Table 1, over the gradient images, to produce a binary excedance map, denoted a D6 product (a gradient thresholded ECF image), per Eqn. 4.

$$D6[i, j] = \begin{cases} 1, & \text{if } D5[i, j] \geq THRESH2 \\ 0, & \text{otherwise.} \end{cases} \quad (4)$$

Figure 12:
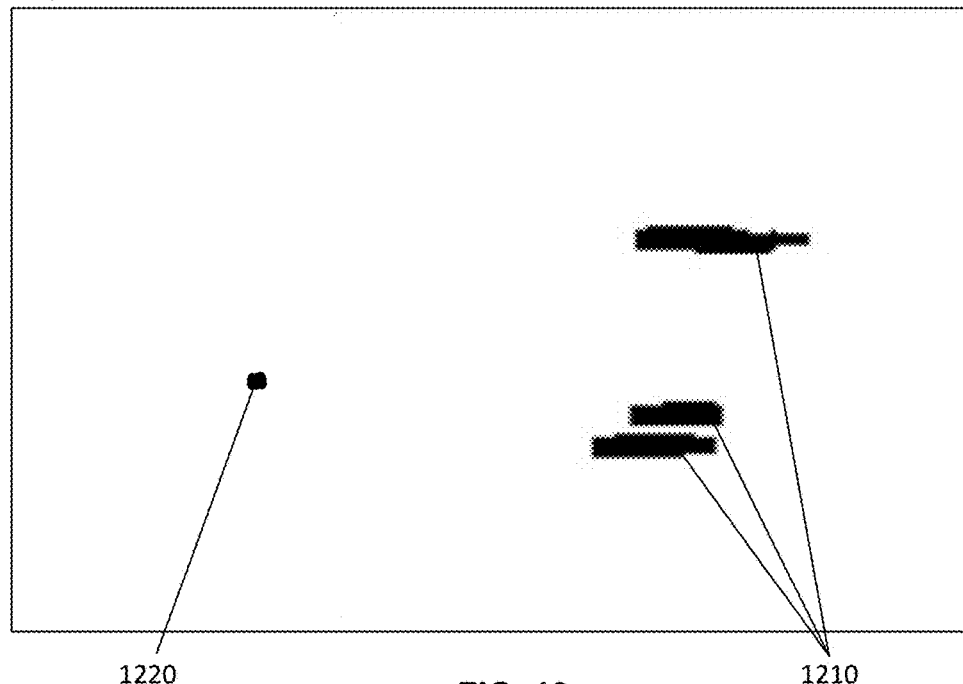
FIG. 12 illustrates a D6 product image formed from processing the D5 product image, according to an embodiment.

A pixel value in the D6 product is set to 1 if in the D5 product the pixel has a value equal to or greater than the THRESH2 value, and a pixel value in the D6 product is set to 0 if in the D5 product the pixel has a value less than the THRESH2 value. Gradient thresholding produces clusters of pixels exhibiting strong evidence of new horizontal energy. Results from thresholding on the example chips are shown in FIG. 12. Energy from the three small moving targets produces a total of three long and thin clusters 1210, while a shorter cluster 1220 is generated from the vehicle.

A pruner component 280 is also included in the target detection component 186. Upon formation of the D6 product, the pruner component 280 is configured to execute a pruning filter to perform dimension-based pruning of the pixel clusters generated in the D6 product. During application of the pruning filter, the pixel clusters in the D6 product are subjected to several constraints based on spatial extent. A range extent of a pixel cluster in the D6 product can be computed, wherein a range (RNG) value is defined as the number of range bins covered by pixels in a cluster. The RNG value can be a function of the depression angle of the airborne antenna relative to the target(s) associated with the potential target smears 610.

Calculating the cross-range extent may be complicated due to the row smoothing undertaken during image processing by the first smoother component 210 and the second smoother component 250. While the smoothing operations performed by the first smoother component 210 and the second smoother component 250 are designed to fill in the space between disjoint pieces of the same horizontal energy source, the smoothing operations also have the potential to extend clusters beyond the actual limits of a generated signal, e.g., for a smear generated for a small moving target. Accordingly, the value of ECF at each pixel in a cluster is compared to a third threshold value, denoted THRESH3 in Table 1. The length of the cluster, value LEN, is defined as the distance between the largest and smallest cross-range values observed in the set of cluster pixels with a ECF above THRESH3.

The pruner component 280 eliminates clusters as a function of any of the following conditions being met:

RNG>RANGE2;

LEN<LEN2;

LEN/RNG<RAT2                                           (5)

where values RANGE2, LEN2 and RAT2 are defined per Table 1. The RANGE2 constraint presented in Eqn. 5 ensures that clusters of pixels do not have a range that is too long to represent a small moving target, e.g., the range is greater than expected based upon a height of a person (e.g., based upon average human height, a percentile of human heights, etc.). The LEN2 constraint presented in FIG. 5 ensures that a cluster of pixels are long enough (e.g., have sufficient smear) to represent a moving target rather than a point reflector. The RAT2 constraint ensures that the cluster of pixels has at least a minimum aspect ratio expected for height and movement of a person moving in a dismounted manner. Further, the respective values of the RANGE2, LEN2, and RAT2 parameters, and other parameters presented herein, ensure that the motion of a dismounted person (e.g., walking, running, sprinting, etc.) is within the confines of anticipated human height and movement, accordingly a smear generated for a person riding through the scene 120 at speed on a motorbike may not be detected as the reflected energy at any given moment will be low, and further, the horizontal smear may be too long for a dismounted person to move at. Appropriate values for RANGE2 and LEN2 can be selected based on radar properties and imaging geometry.

Figure 13:
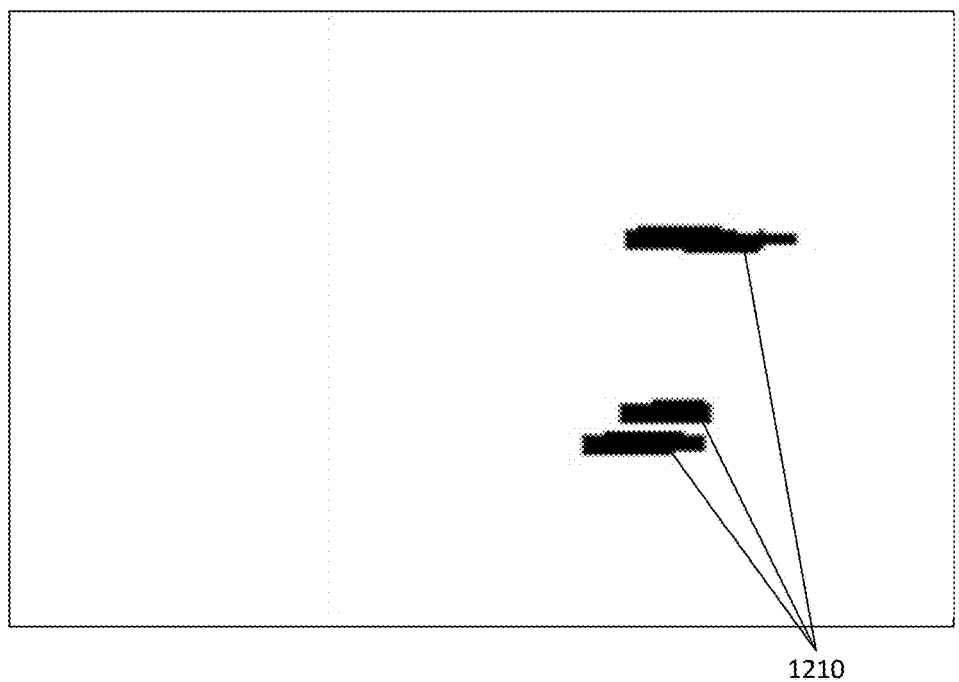
FIG. 13 illustrates a D7 product image formed from processing the D5 product image, according to an embodiment.

Results of pruning clusters based on geometric properties for the example chip is shown in the D7 product (a pruned ECF image) presented in FIG. 13. All three of the clusters 1210 generated by the small targets meet the conditions presented in Eqn. 5, with dimensions (RNG, LEN) equal to (6, 23), (6, 17), and (7, 32) and are retained in the D7 product. The cluster 1220 generated for the vehicle, with dimension (5, 11), fails due to insufficient length, and accordingly, is omitted during generation of the D7 product.

A mapper component 290 is also included in the target detection component 186, wherein the mapper component 290 is utilized to correlate the detected clusters identified in D7 to the corresponding pixels in the initial SAR image(s) (e.g., in the second SAR image 172) to enable the locations of the signatures of the small moving target(s) in the initial SAR image to be identified (e.g., highlighted). In response to the mapper component 290 identifying (or not) a small moving target in a pair of registered SAR images, the mapper component 290 can be configured to generate an indication 295 (including a location) of the signature of a small moving target being present in a scene.

Returning to FIG. 1, the computing device 145 can further include a display device 190 which can be utilized to present any of the images/products presented in FIGS. 3-13 generated during detection of a small moving target in a scene. In an embodiment, information included in the indication 295 can be applied to the second SAR image 172 to indicate presence of the small moving target(s) in the image, wherein the display device 190 can present the SAR image 172 with the small moving target(s) indicated thereon (e.g., as an indication of target(s) in scene 195), e.g., smears 610 are identified as being small moving targets.

Figure 14:
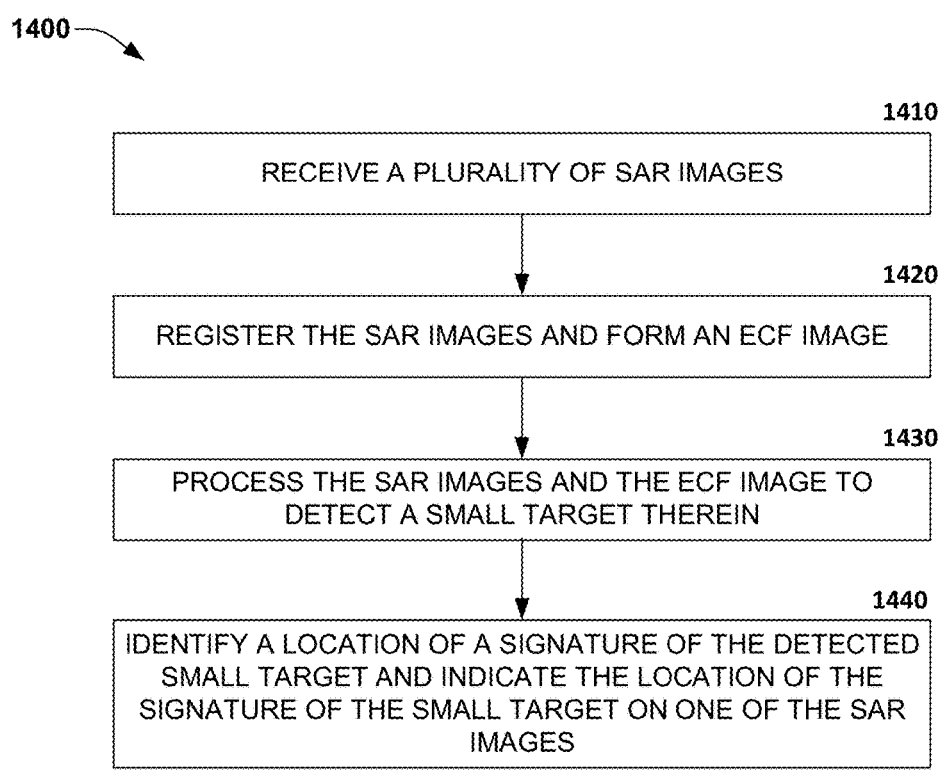
FIG. 14 is a flow diagram illustrating an exemplary methodology for detecting a small moving target.

FIG. 14 illustrates an exemplary methodology relating to detecting small moving targets in SAR imaging. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

At 1410, a pair of SAR images are received, wherein the first SAR image is a first capture of a scene and the second SAR image is a subsequent, second capture of a scene. It is desired to detect whether any small moving targets are present in the second scene. The SAR images can be registered to form a complex SAR image stack, from which SAR magnitude images can be generated. The SAR magnitude images can undergo smoothing to minimize SAR speckle on magnitudes in the SAR images, and subsequent images/products formed therefrom.

At 1420, a positive change only ECF image can also be formed from the complex SAR image stack, wherein the positive change only ECF image can be formed based upon zeroing out any ECF at pixel locations where signal magnitude has dropped between the first pass and the second pass, e.g., a negative change in energy.

At 1430, the SAR images and the ECF image can be processed to enable detection of a small target in the ECF image, wherein detection is based upon identifying pixels (e.g., a cluster of pixels) having a signal magnitude associated with a radar return from a small target while discounting radar returns from horizontally aligned reflectors, large objects, spurious radar returns, etc.

At 1440, the identified pixels are applied to one of the SAR images in the pair to facilitate determining a location(s) of the signature(s) of the small target within the scene. In an embodiment, the small target will be located in the later captured SAR image, e.g., enabling prompt detection of the small target in the scene. However, the small target can be located in the initially captured SAR image and not in the later captured SAR image, enabling determination of a route of travel for the small target and any other small targets that subsequently travel through the scene at a later time.

Figure 15:
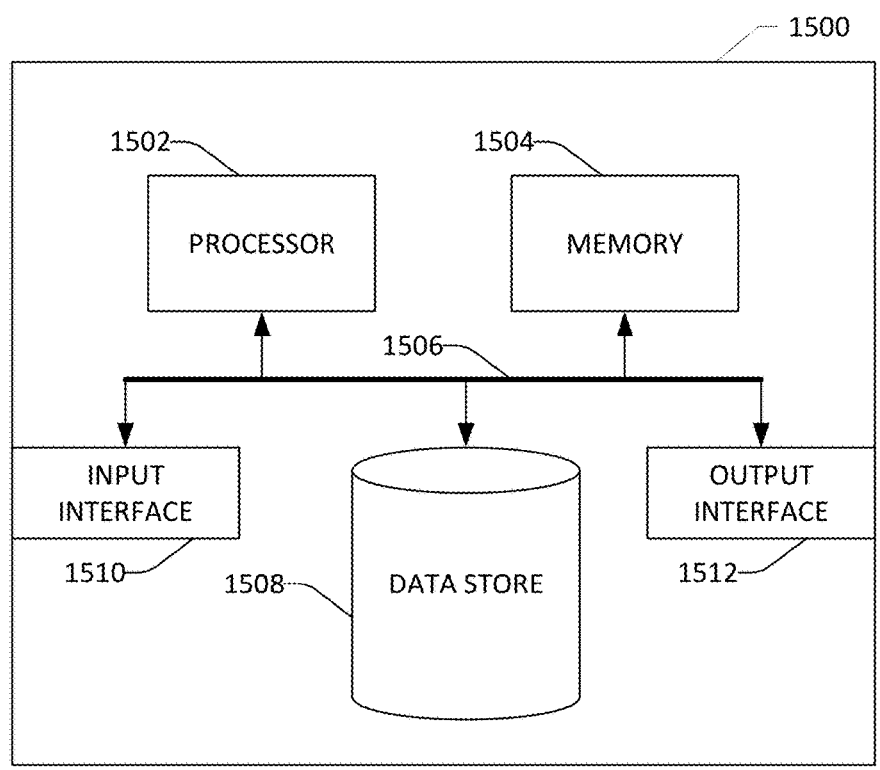
FIG. 15 illustrates an exemplary computing device.

Referring now to FIG. 15, a high-level illustration of an exemplary computing device 1500 that can be used in accordance with the systems and methodologies disclosed herein is illustrated. For instance, the computing device 1500 may be utilized to identify whether a small moving object is in a radar image of a scene. For example, computing device 1500 can operate as the radar system 130, the computing device 145, etc. The computing device 1500 includes at least one processor 1502 that executes instructions that are stored in a memory 1504. The instructions may be, for instance, instructions for implementing functionality described as being carried out by one or more components discussed above or instructions for implementing one or more of the methods described above. The processor 1502 may access the memory 1504 by way of a system bus 1506.

In addition to storing executable instructions, the memory 1504 may also store operating parameters, required operating parameters, and so forth.

The computing device 1500 additionally includes a data store 1508 that is accessible by the processor 1502 by way of the system bus 1506. The data store 1508 may include executable instructions, operating parameters, required operating parameters, etc. The computing device 1500 also includes an input interface 1510 that allows external devices to communicate with the computing device 1500. For instance, the input interface 1510 may be used to receive instructions from an external computer device, from a user, etc. The computing device 1500 also includes an output interface 1512 that interfaces the computing device 1500 with one or more external devices. For example, the computing device 1500 may display text, images, etc., by way of the output interface 1512.

Additionally, while illustrated as a single system, it is to be understood that the computing device 1500 may be a distributed system. Thus, for instance, several devices may be in communication by way of a network connection and may collectively perform tasks described as being performed by the computing device 1500.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
   at least one processor; and
   memory that comprises instructions that, when executed by the at least one processor, cause the at least one processor to perform acts comprising:
      generating an excess coherency factor (ECF) image of a region, the ECF image generated based upon a stack of registered synthetic aperture radar (SAR) images, the stack of registered SAR images comprises:
         a first SAR image of the region captured at a first time; and
         a second SAR image of the region captured at a second time;
      performing a filtering operation over the ECF image to generate a filtered ECF image, the filtering operation configured to modify a portion of the ECF image based upon the portion of the ECF image being representative of an object in the region other than a human or other animal; and
      outputting an indication of a location of a target in the region to an operator based upon the filtered ECF image, the target being one of a human or other animal.

2. The computing system of claim 1, wherein performing the filtering operation over the ECF image of the region comprises:
   registering the first SAR image and the second SAR image to generate the stack of registered SAR images, wherein the stack of registered SAR images are complex valued;
   computing a first SAR magnitude image from the first SAR image, wherein the first SAR magnitude image is a real valued image;
   computing a second SAR magnitude image from the second SAR image, wherein the second SAR magnitude image is a real valued image;
   executing a mean box filter over the first SAR magnitude image to produce a first smoothed SAR image;
   executing the mean box filter over the second SAR magnitude image to produce a second smoothed SAR image; and
   for each pixel in the ECF image, setting a value of the pixel to zero when a value of a corresponding pixel in the first smoothed SAR image is greater than a value of a corresponding pixel in the second smoothed SAR image, to form a magnitude removed ECF image.

3. The computing system of claim 2, wherein performing the filtering operation over the ECF image of the region further comprises:
   identifying at least one cluster of pixels having a non-zero magnitude in the magnitude removed ECF image;
   determining, for each column of consecutively aligned pixels in each cluster of pixels, whether each column of consecutively aligned pixels exceed a first threshold value, wherein the first threshold value is a pixel distance in a range direction of the magnitude removed ECF image, wherein the pixel distance defines a number of pixels distinguishing a height of the target from a height of a large object; and
   in response to determining a column of consecutively aligned pixels exceeds the first threshold value, setting a value of the consecutive pixels to zero to form an object removed ECF image.

4. The computing system of claim 3, wherein performing the filtering operation over the ECF image of the region further comprises:
   identifying at least one cluster of pixels having a non-zero energy in the object removed ECF image; and
   executing a row differencing filter on the identified at least one cluster of pixels in the object removed ECF image, wherein the row differencing filter increases a magnitude value for those pixels located on a first side of the at least one cluster of pixels and decreases the magnitude value for those pixels located on a second side of the at least one cluster of pixels, wherein the first side and the second side are opposite to each other and are aligned in a cross-range direction, the row differencing filter forming a row differenced ECF image.

5. The computing system of claim 4, wherein performing the filtering operation over the ECF image of the region further comprises:
   executing a smoothing filter to the row differenced ECF image, wherein the smoothing filter has a box size dimension, wherein the smoothing filter is applied in the cross-range direction and extends a number of pixels in a non-zero energy cluster by the box size dimension, causing a size of a cluster of pixels in the row differenced ECF image to be extended in the cross-range direction, to form a cross-range smoothed ECF image.

6. The computing system of claim 5, wherein performing the filtering operation over the ECF image of the region further comprises:
   calculating a pixel band value, wherein the pixel band value is an integer equaling half of a filter row value, the filter row value being for gradient enhancing the cross-range smothered ECF image; and
   executing a bilateral filter on at least one cluster of non-zero energy pixels included in the cross-range smoothed ECF image, wherein the bilateral filter is based upon the pixel band value; and the bilateral filter determines for each pixel in the at least one cluster of pixels:
      a maximum value for all of the pixels extending in a first range direction from the pixel in the at least one cluster of pixels, wherein a number of pixels in the first range direction from the pixel in the at least one cluster of pixels is limited by the pixel band value; and
      a minimum value for all of the pixels extending in a second range direction from the pixel in the at least one cluster of pixels, wherein a number of pixels in the second range direction from the pixel in the at least one cluster of pixels is limited by the pixel band value;

determining a pixel value based upon a difference between the maximum value and the minimum value; and applying the pixel value to the pixel in the at least one cluster of pixels, to form a gradient enhanced ECF image.

7. The computing system of claim 6, wherein performing the filtering operation over the ECF image of the region further comprises:

executing a gradient threshold filter over the gradient enhanced ECF image to produce a gradient thresholded ECF image; and for each pixel in the gradient thresholded ECF image, setting a value of the pixel to zero when a value of the pixel is less than a second threshold value, and setting the value of the pixel to one when the value of the pixel is equal to, or greater than the second threshold value, wherein the second threshold value is a gradient threshold of the gradient enhanced ECF image.

8. The computing system of claim 7, wherein performing the filtering operation over the ECF image of the region further comprises:

applying a third threshold value to each pixel in the ECF image generated based upon a stack of registered synthetic aperture radar (SAR) images, to produce a thresholded ECF image; and for each pixel in the ECF image having a value less than the third threshold value, setting a value of the corresponding pixel in the gradient thresholded ECF image to zero.

9. The computing system of claim 8, wherein performing the filtering operation over the ECF image of the region further comprises:

executing a pruning filter for each cluster of pixels in the gradient thresholded ECF image to form a pruned ECF image;

for each pixel cluster having a range value that exceeds a predefined range value, setting each pixel in the pixel cluster to a value of zero;

for each pixel cluster having a length that is less than a predefined length value, setting each pixel in the pixel cluster to a value of zero; and for each pixel cluster having a ratio of length to range that is less than a ratio value, setting each pixel in the pixel cluster to a value of zero.

10. The computing system of claim 9, wherein performing the filtering operation over the ECF image of the region further comprises:

identifying pixels having a non-zero value in the pruned ECF image;

generating a notification indicating a location of each non-zero value pixel; and applying the location of each non-zero value pixel to the second SAR image to enable identification of the target in the second SAR image.

11. A method executed by a processor of a computing device, the method comprising:

generating an excess coherency factor (ECF) image of a region, the ECF image generated based upon a stack of registered synthetic aperture radar (SAR) images, the stack of registered SAR images comprises:

a first SAR image of the region captured at a first time; and a second SAR image of the region captured at a second time;

performing a filtering operation over the ECF image to generate a filtered ECF image, the filtering operation configured to modify a portion of the ECF image based upon the portion of the ECF image being representative of an object in the region other than a human or other animal; and outputting an indication of a location of a target in the region to an operator based upon the filtered ECF image, the target being one of a human or other animal.

12. The method of claim 11, wherein performing the filtering operation over the ECF image comprises:

registering the first SAR image and the second SAR image to generate the stack of registered SAR images, wherein the stack of registered SAR images are complex valued;

computing a first SAR magnitude image from the first SAR image, wherein the first SAR magnitude image is a real valued image;

computing a second SAR magnitude image from the second SAR image, wherein the second SAR magnitude image is a real valued image;

executing a mean box filter over the first SAR magnitude image to produce a first smoothed SAR image;

executing the mean box filter over the second SAR magnitude image to produce a second smoothed SAR image; and for each pixel in the ECF image, setting a value of the pixel to zero when a value of a corresponding pixel in the first smoothed SAR image is greater than a value of a corresponding pixel in the second smoothed SAR image, to form a magnitude removed ECF image.

13. The method of claim 12, wherein performing the filtering operation over the ECF image further comprises:

identifying at least one cluster of pixels having a non-zero magnitude in the magnitude removed ECF image;

determining, for each column of consecutively aligned pixels in each cluster of pixels, whether each column of consecutively aligned pixels exceed a first threshold value, wherein the first threshold value is a pixel distance in a range direction of the magnitude removed ECF image, wherein the pixel distance defines a number of pixels distinguishing a height of the target from a height of a large object; and in response to determining a column of consecutively aligned pixels exceeds the first threshold value, setting a value of the consecutive pixels to zero to form an object removed ECF image.

14. The method of claim 13, wherein performing the filtering operation over the ECF image further comprises:

identifying at least one cluster of pixels having a non-zero energy in the object removed ECF image; and executing a row differencing filter on the identified at least one cluster of pixels in the object removed ECF image, wherein the row differencing filter increases a magnitude value for those pixels located on a first side of the at least one cluster of pixels and decreases the magnitude value for those pixels located on a second side of the at least one cluster of pixels, wherein the first side and the second side are opposite to each other and are aligned in a cross-range direction, the row differencing filter forming a row differenced ECF image.

15. The method of claim 14, wherein performing the filtering operation over the ECF image further comprises:

executing a smoothing filter to the row differenced ECF image, wherein the smoothing filter has a box size dimension, wherein the smoothing filter is applied in the cross-range direction and extends a number of pixels in a non-zero energy cluster by the box size dimension, causing a size of a cluster of pixels in the row differenced ECF image to be extended in the cross-range direction, to form a cross-range smoothed ECF image;

calculating a pixel band value, wherein the pixel band value is an integer equaling half of a filter row value; and executing a bilateral filter on at least one cluster of non-zero energy pixels included in the cross-range smoothed ECF image, wherein the bilateral filter is based upon the pixel band value; and the bilateral filter determines for each pixel in the at least one cluster of pixels:
- a maximum value for all of the pixels extending in a first range direction from the pixel in the at least one cluster of pixels, wherein a number of pixels in the first range direction from the pixel in the at least one cluster of pixels is limited by the pixel band value;
- a minimum value for all of the pixels extending in a second range direction from the pixel in the at least one cluster of pixels, wherein a number of pixels in the second range direction from the pixel in the at least one cluster of pixels is limited by the pixel band value;

determining a pixel value based upon a difference between the maximum value and the minimum value; and applying the pixel value to the pixel in the at least one cluster of pixels, to form a gradient enhanced ECF image.

16. The method of claim 15, wherein performing the filtering operation over the ECF image further comprises:
executing a gradient threshold filter over the gradient enhanced ECF image to produce a gradient thresholded ECF image; and
for each pixel in the gradient thresholded ECF image, setting a value of the pixel to zero when a value of the pixel is less than a second threshold value, and setting the value of the pixel to one when the value of the pixel is equal to, or greater than the second threshold value, wherein the second threshold value is a gradient threshold of the gradient enhanced ECF image.

17. The method of claim 16, wherein performing the filtering operation over the ECF image further comprises:
applying a third threshold value to each pixel in the ECF image generated based upon a stack of registered synthetic aperture radar (SAR) images, to produce a thresholded ECF image; and
for each pixel in the ECF image having a value less than the third threshold value, setting a value of the corresponding pixel in the gradient thresholded ECF image to zero.

18. The method of claim 17, wherein performing the filtering operation over the ECF image further comprises:
executing a pruning filter for each cluster of pixels in the gradient thresholded ECF image to form a pruned ECF image;
for each pixel cluster having a range value that exceeds a predefined range value, setting each pixel in the pixel cluster to a value of zero;
for each pixel cluster having a length that is less than a predefined length value, setting each pixel in the pixel cluster to a value of zero; and
for each pixel cluster having a ratio of length to range that is less than a predefined ratio value, setting each pixel in the pixel cluster to a value of zero.

19. The method of claim 18, wherein performing the filtering operation over the ECF image further comprises:
identifying pixels having a non-zero value in the pruned ECF image;
generating a notification indicating a location of each non-zero value pixel; and
applying the location of each non-zero value pixel to the second SAR image to enable identification of the target in the second SAR image.

20. A computer-readable storage medium comprising instructions that, when executed by a processor, cause the processor to perform acts comprising:
generating an excess coherency factor (ECF) image of a region, the ECF image generated based upon a stack of registered synthetic aperture radar (SAR) images, the stack of registered SAR images comprises:
a first SAR image of the region captured at a first time; and
a second SAR image of the region captured at a second time; and
performing a filtering operation over the ECF image to generate a filtered ECF image, the filtering operation configured to modify a portion of the ECF image based upon the portion of the ECF image being representative of an object in the region other than a human or other animal and
outputting an indication of a location of a target in the region to an operator based upon the filtered ECF image, the target being one of a human or other animal.

* * * * *